Dec. 30, 1947.  A. COX  2,433,438
TELEPHOTO OPTICAL OBJECTIVE
Filed May 1, 1946
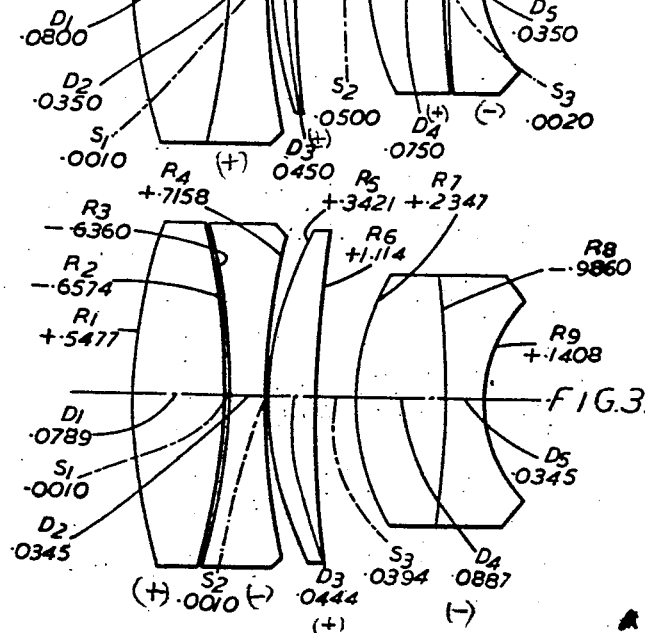
Inventor
Arthur Cox
By
Emery, Holcombe & Blair
Attorney Patented Dec. 30, 1947

2,433,438

UNITED STATES PATENT OFFICE 2,433,438

TELEPHOTO OPTICAL OBJECTIVE

Arthur Cox, Leicester, England, assignor to Taylor, Taylor & Hobson Limited, Leicester, England, a company of Great Britain Application May 1, 1946, Serial No. 666,415
In Great Britain June 18, 1945

19 Claims. (Cl. 88—57)

This invention relates to optical objectives of the kind known as telephoto objectives, which are corrected for spherical and chromatic aberrations, coma, astigmatism and field curvature, and in which the axial distance from the front surface of the objective to the back focal plane is materially less than in objectives of the conventional types of the same focal length and aperture. Such objectives usually comprise a convergent member disposed in front of and widely spaced from a divergent member, each member being composed of a group of two or more lens elements disposed close together and commonly (though not invariably) cemented together, the nodal points of the objective both lying in front of the front surface of the objective. It should be made clear that the "front" of the objective is to be understood as the side of the longer conjugate in accordance with the usual convention. In most telephoto objectives the two members (whether having internal air gaps or not) are of meniscus form with their concave faces towards one another.

United States of America Patent No. 2,366,597, filed in the name of the present applicant, relates to an improved telephoto objective in which better zonal spherical aberration correction is obtained without detriment to the other corrections by departing to some extent from the conventional construction of telephoto objectives. Such prior objective comprises two convergent members disposed in front of a divergent member, each of the three members being formed of two or more elements, the two axial air spaces separating the three members each being less than one-eighth of the equivalent focal length of the objective.

The present applicant's copending United States of America patent application Serial No. 666,060, filed April 30, 1946, relates to a telephoto objective of the type known in itself comprising a convergent front member and a divergent rear member, each consisting of a cemented or uncemented doublet having a convergent element and a divergent element. In order to obtain improved spherical aberration correction in an objective of this known type, the divergent rear member consists of a meniscus doublet with its bounding surfaces convex to the front, the front surface of such member having a radius of curvature lying .20 and .30 times the equivalent focal length of the objective, whilst the radius of curvature of the rear surface of such member lies between .10 and .20 times such focal length, and the axial thickness of the convergent element in the convergent front doublet is not less than .045 times such focal length.

The present invention has for its object to provide a still further improvement in the aberration corrections and is concerned with an objective which may be regarded as a development of that of such copending application, in that it employs a generally similar divergent rear member but in combination with a rather more complex convergent front system.

Thus the objective according to the present invention comprises a divergent rear member, and a convergent front system consisting of a compound convergent member in front of a simple meniscus convergent member, the divergent rear member being in the form of a meniscus doublet having a convergent element and a divergent element, the front and rear bounding surfaces of such member being convex to the front and respectively having radii of curvature between .20 and .30 and between .10 and .20 times the equivalent focal length of the objective, whilst the radius of curvature of the front surface of the simple convergent member also convex to the front lies between .25 and .55 times such focal length, and the difference between the radii of curvature of the front and rear surface of the whole convergent system is not less than .45 times such focal length.

The compound convergent member preferably includes a contact surface concave to the front and having effective radius of curvature lying between .6 and 4.0 times the equivalent focal length of the objective.

It should be made clear that the term "contact surface" is herein used, whether or not the two cooperating surfaces between the pair of elements have exactly the same curvature and whether or not cement is actually employed to connect the two surfaces together. In the case of a "broken" contact surface (that is, one with a small air gap between the two surfaces), the effective radius of curvature of the surface can be taken to be the harmonic mean between the radii of curvature of the two cooperating surfaces, or in other words the reciprocal of the mean curvature, that is $2RR_1/(R+R_1)$ where $R$ and $R_1$ are the two radii. Similarly the power of a broken contact surface is the algebraic sum of the powers of the two surfaces, that is $$(N-1)/R+(1-N_1)/R_1$$

where $N$ and $N_1$ are the mean refractive indices of the materials of which the cooperating elements are made.

Preferably, the contact surface in the divergent rear member is utilised to provide a useful contribution to the spherical aberration correction, and to this end is dispersive and has a power lying between .05 and 4.0 times the equivalent power of the objective. Such contact surface, if cemented, is preferably concave to the front with radius of curvature lying between .4 and 2.0 times the equivalent focal length of the objective, whilst if the contact surface is broken it may be convex or concave to the front with radius of curvature not less than half such equivalent focal length.

The two axial air separations between the three members of the objective are preferably each not greater than one-eighth of the equivalent focal length of the objective.

In the divergent rear member, the axial thickness of the convergent element is conveniently not less than .05 times the equivalent focal length of the whole objective. The divergent element of such member may be cemented behind the convergent element and in such case is preferably made of a material whose mean refractive index exceeds that of the convergent element by not less than .045.

In the accompanying drawings,

Figures 1, 2 and 3 respectively illustrate three convenient practical examples of telephoto objective according to the invention.

Numerical data for these examples are given in the following tables, in which $R_1$, $R_2$ ... represent the radii of curvature of the individual surfaces of the objective counting from the front (the positive sign indicating that the surface is convex to the front and the negative sign that it is concave thereto), $D_1$, $D_2$ ... represent the axial thicknesses of the individual lens elements, and $S_1$, $S_2$ ... represent the axial air separations between the elements. The tables also give the mean refractive indices, for the D-line and the Abbé V numbers of the materials of which the lens elements are made.

*Example I*

| Equivalent focal length 1.000. Relative Aperture F/2.8 | | | |
|---|---|---|---|
| Radius | Thickness or Air Separation | Refractive Index $n_D$ | Abbé V Number |
| $R_1+.4960$ | $D_1$ .0794 | 1.623 | 60.3 |
| $R_2-.7618$ | $D_2$ .0347 | 1.699 | 30.5 |
| $R_3+.7618$ | $S_1$ .0010 | | |
| $R_4+.3701$ | $D_3$ .0446 | 1.623 | 60.3 |
| $R_5+1.510$ | $S_2$ .0397 | | |
| $R_6+.2363$ | $D_4$ .0893 | 1.547 | 45.7 |
| $R_7-.9920$ | $D_5$ .0347 | 1.613 | 57.6 |
| $R_8+.1417$ | | | |

*Example II*

| Equivalent focal length 1.000. Relative Aperture F/2.8 | | | |
|---|---|---|---|
| Radius | Thickness or Air Separation | Refractive Index $n_D$ | Abbé V Number |
| $R_1+.5000$ | $D_1$ .0800 | 1.623 | 60.3 |
| $R_2-.7690$ | $D_2$ .0350 | 1.699 | 30.5 |
| $R_3+.7690$ | $S_1$ .0010 | | |
| $R_4+.3730$ | $D_3$ .0450 | 1.623 | 60.3 |
| $R_5+1.522$ | $S_2$ .0500 | | |
| $R_6+.2408$ | $D_4$ .0750 | 1.621 | 36.1 |
| $R_7+.8700$ | $S_3$ .0020 | | |
| $R_8+1.176$ | $D_5$ .0350 | 1.644 | 48.3 |
| $R_9+.1452$ | | | |

*Example III*

| Equivalent focal length 1.000. Relative Aperture F/2.8 | | | |
|---|---|---|---|
| Radius | Thickness or Air Separation | Refractive Index $n_D$ | Abbé V Number |
| $R_1+.5477$ | $D_1$ .0789 | 1.690 | 54.6 |
| $R_2-.6574$ | $S_1$ .0010 | | |
| $R_3-.6360$ | $D_2$ .0345 | 1.699 | 30.5 |
| $R_4+.7158$ | $S_2$ .0010 | | |
| $R_5+.3421$ | $D_3$ .0444 | 1.623 | 60.3 |
| $R_6+1.114$ | $S_3$ .0394 | | |
| $R_7+.2347$ | $D_4$ .0887 | 1.547 | 45.7 |
| $R_8-.9860$ | $D_5$ .0345 | 1.613 | 57.6 |
| $R_9+.1408$ | | | |

The back focal length in Example I is .5375, in Example II, .5464, and in Example III .5355 times the equivalent focal length of the objective.

Example I employs cemented contact surfaces in both compound members, whilst the other two examples each have one cemented contact and one broken contact. In Example II the broken contact is in the divergent rear member, whilst in Example III the broken contact is in the convergent front member.

It will be seen that the difference between the radii of the front and rear surfaces of the convergent front system is 1.014 in Example I, 1.022 in Example II and .566 in Example III, times the equivalent focal length of the objective.

In Example I the cemented contact surface in the divergent rear member is concave to the front and has dispersive power .0665 times the equivalent power of the objective. The difference between the refractive indices of the two elements in this member is .066.

In Example III the cemented contact surface in the divergent rear member is again concave to the front and has dispersive power .0670 times the equivalent power of the objective. The index difference across such surface is again .066.

In Example II on the other hand, the contact in the divergent rear member is broken and is slightly convex to the front, the radii of the individual surfaces being .8700 and 1.176. The effective radius of curvature of such broken contact is thus approximately 1.000, the contact having dispersive power .1665 times the equivalent power of the objective.

What I claim as my invention and declare to secure by Letters Patent is:

1. A telephoto objective corrected for spherical and chromatic aberrations, coma, astigmatism and field curvature, comprising a divergent rear member and a convergent front system consisting of a compound convergent member in front of a simple meniscus convergent member, the divergent rear member being in the form of a meniscus doublet having a convergent element and a divergent element, the front and rear bounding surfaces of such member being convex to the front and respectively having radii of curvature between .20 and .30 and between .10 and .20 times the equivalent focal length of the objective, whilst the radius of curvature of the front surface of the simple convergent member also convex to the front lies between .25 and .55 times such focal length, and the difference between the radii of curvature of the front and rear surfaces of the whole convergent system is not less than .45 times and not greater than 1.25 times such focal length.

2. A telephoto objective corrected for spherical and chromatic aberrations, coma, astigmatism and field curvature, comprising a divergent rear member and a convergent front system consisting of a compound convergent member in front of a simple meniscus convergent member, the divergent rear member being in the form of a meniscus doublet having a convergent element and a divergent element, the front and rear bounding surfaces of such member being convex to the front and respectively having radii of curvature between .20 and .30 and between .10 and .20 times the equivalent focal length of the objective, whilst the radius of curvature of the front surface of the simple convergent member also convex to the front lies between .25 and .55 times such focal length, and the difference between the radii of curvature of the front and rear surfaces of the whole convergent system is not less than .45 times and not greater than 1.25 times such focal length, the compound convergent member including a contact surface which is concave to the front and has effective radius of curvature lying between .6 and 4.0 times such focal length.

3. A telephoto objective as claimed in claim 1, in which the contact surface in the divergent rear member has a dispersive power lying between .05 and .40 times the equivalent power of the whole objective.

4. A telephoto objective as claimed in claim 2, in which the contact surface in the divergent rear member has a dispersive power lying between .05 and .40 times the equivalent power of the whole objective.

5. A telephoto objective as claimed in claim 1, in which the contact surface in the divergent rear member is cemented and concave to the front and has a dispersive power between .05 and .40 times the equivalent power of the whole objective, the radius of curvature of such surface lying between .4 and 2.0 times the equivalent focal length of the objective.

6. A telephoto objective as claimed in claim 2, in which the contact surface in the divergent rear member is cemented and concave to the front and has a dispersive power between .05 and .40 times the equivalent power of the whole objective, the radius of curvature of such surface lying between .4 and 2.0 times the equivalent focal length of the objective.

7. A telephoto objective as claimed in claim 1, in which the divergent element of the divergent rear member is cemented behind the convergent element thereof, and is made of a material whose mean refractive index exceeds that of the convergent element by not less than .045 and not more than .12.

8. A telephoto objective as claimed in claim 2, in which the divergent element of the divergent rear member is cemented behind the convergent element thereof, and is made of a material whose mean refractive index exceeds that of the convergent element by not less than .045 and not more than .12.

9. A telephoto objective as claimed in claim 1, in which the divergent element of the divergent rear member is cemented behind the convergent element thereof, and is made of a material whose mean refractive index exceeds that of the convergent element by not less than .045 and not more than .12, the cemented contact surface having a dispersive power between .05 and .40 times the equivalent power of the whole objective.

10. A telephoto objective as claimed in claim 1, in which the contact surface in the divergent rear member is broken and has effective radius of curvature not less than half and not more than twice the equivalent focal length of the objective, such surface having a dispersive power between .05 and .40 times the equivalent power of the whole objective.

11. A telephoto objective as claimed in claim 2, in which the contact surface in the divergent rear member is broken and has effective radius of curvature not less than half and not more than twice the equivalent focal length of the objective, such surface having a dispersive power between .05 and .40 times the equivalent power of the whole objective.

12. A telephoto objective as claimed in claim 1, in which the axial air separations between the three members of the objective are each not less than substantially zero and not greater than .125 times the equivalent focal length of the objective.

13. A telephoto objective as claimed in claim 2, in which the axial air separations between the three members of the objective are each not less than substantially zero and not greater than .125 times the equivalent focal length of the objective.

14. A telephoto objective as claimed in claim 1, in which the axial thickness of the convergent element of the divergent rear member is not less than .05 times and not greater than .125 times the equivalent focal length of the objective.

15. A telephone objective as claimed in claim 2, in which the axial thickness of the convergent element of the divergent rear member is not less than .05 times and not greater than .125 times the equivalent focal length of the objective.

16. A telephoto objective as claimed in claim 1, in which the contact surface in the divergent rear member has a dispersive power lying between .05 and .40 times the equivalent power of the whole objective, the convergent element in such member having an axial thickness not less than .05 times and not greater than .125 times the equivalent focal length of the objective, whilst the axial air separations between the three members of the objective are each less than .125 times such focal length.

17. A telephoto objective having numerical data substantially as set forth in the following table:

| Equivalent focal length 1.000. Relative Aperture F/2.8 | | | |
|---|---|---|---|
| Radius | Thickness or Air Separation | Refractive Index $n_D$ | Abbé V Number |
| $R_1$+.4960 | | | |
| | $D_1$ .0794 | 1.623 | 60.3 |
| $R_2$−.7618 | | | |
| | $D_2$ .0347 | 1.699 | 30.5 |
| $R_3$+.7618 | | | |
| | $S_1$ .0010 | | |
| $R_4$+.3701 | | | |
| | $D_3$ .0446 | 1.623 | 60.3 |
| $R_5$+1.510 | | | |
| | $S_2$ .0397 | | |
| $R_6$+.2363 | | | |
| | $D_4$ .0893 | 1.547 | 45.7 |
| $R_7$−.9920 | | | |
| | $D_5$ .0347 | 1.613 | 57.6 |
| $R_8$+.1417 | | | | wherein $R_1, R_2 \ldots$ represent the radii of curvature of the individual surfaces, the positive sign indicating that the surface is convex to the front and the negative sign that it is concave thereto, $D_1, D_2 \ldots$ represent the axial thicknesses of the individual elements, and $S_1 S_2$ represent the axial air separations between the three members of the objective.

18. A telephoto objective having numerical data substantially as set forth in the following table:

Fig. 2

| Equivalent focal length 1.000. Relative Aperture F/2.8 | | | |
|---|---|---|---|
| Radius | Thickness or Air Separation | Refractive Index $n_D$ | Abbé V Number |
| $R_1+.5000$ | $D_1$ .0800 | 1.623 | 60.3 |
| $R_2-.7690$ | $D_2$ .0350 | 1.699 | 30.5 |
| $R_3+.7690$ | $S_1$ .0010 | | |
| $R_4+.3730$ | $D_3$ .0450 | 1.623 | 60.3 |
| $R_5+1.522$ | $S_2$ .0500 | | |
| $R_6+.2408$ | $D_4$ .0750 | 1.621 | 36.1 |
| $R_7+.8700$ | $S_3$ .0020 | | |
| $R_8+1.176$ | $D_5$ .0350 | 1.644 | 48.3 |
| $R_9+.1452$ | | | | wherein $R_1, R_2 \ldots$ represent the radii of curvature of the individual surfaces, the positive sign indicating that the surface is convex to the front and the negative sign that it is concave thereto, $D_1, D_2 \ldots$ represent the axial thicknesses of the individual elements, and $S_1 S_2 S_3$ represent the axial air separations between the various components.

19. A telephoto objective having numerical data substantially as set forth in the following table:

Fig. 3

| Equivalent focal length 1.000. Relative Aperture F/2.8 | | | |
|---|---|---|---|
| Radius | Thickness or Air Separation | Refractive Index $n_D$ | Abbé V Number |
| $R_1+.5477$ | $D_1$ .0789 | 1.690 | 54.6 |
| $R_2-.6574$ | $S_1$ .0010 | | |
| $R_3-.6360$ | $D_2$ .0345 | 1.699 | 30.5 |
| $R_4+.7158$ | $S_2$ .0010 | | |
| $R_5+.3421$ | $D_3$ .0444 | 1.623 | 60.3 |
| $R_6+1.114$ | $S_3$ .0394 | | |
| $R_7+.2347$ | $D_4$ .0887 | 1.547 | 45.7 |
| $R_8-.9860$ | $D_5$ .0345 | 1.613 | 57.6 |
| $R_9+.1408$ | | | | wherein $R_1, R_2 \ldots$ represent the radii of curvature of the individual surfaces, the positive sign indicating that the surface is convex to the front and the negative sign that it is concave thereto, $D_1, D_2 \ldots$ represent the axial thicknesses of the individual elements, and $S_1 S_2 S_3$ represent the axial air separations between the various components.

ARTHUR COX.

REFERENCES CITED

The following references are of record in the file of this patent:

UNITED STATES PATENTS

| Number | Name | Date |
|---|---|---|
| 2,321,973 | Bennett | June 15, 1943 |
| 2,366,597 | Cox | Jan. 2, 1945 |
| 2,378,170 | Aklin | June 12, 1945 |
| 2,382,669 | Schade | Aug. 14, 1945 |

FOREIGN PATENTS

| Number | Country | Date |
|---|---|---|
| 222,709 | Great Britain | Oct. 9, 1924 |
| 487,271 | Germany | Dec. 11, 1929 |